United States Patent
Bardelli

(10) Patent No.: US 6,556,644 B2
(45) Date of Patent: Apr. 29, 2003

(54) FREQUENCY MULTIPLIER CIRCUIT AND METHOD USING ABOVE CIRCUIT FOR A PERIOD TIME DIVISION IN SUBPERIODS, FOR A BRUSHLESS MOTOR

(75) Inventor: Roberto Bardelli, Fino Mornasco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/872,632

(22) Filed: Jun. 1, 2001

(65) Prior Publication Data

US 2001/0048335 A1 Dec. 6, 2001

(30) Foreign Application Priority Data

Jun. 2, 2000 (EP) .............................. 00830396

(51) Int. Cl.[7] .............................................. H03K 21/00
(52) U.S. Cl. .................... 377/48; 327/116; 327/119; 327/121
(58) Field of Search ................. 327/116, 119, 327/121; 377/48

(56) References Cited

U.S. PATENT DOCUMENTS

| | | | | |
|---|---|---|---|---|
| 4,851,709 A | | 7/1989 | Bailey et al. ................. 307/228 |
| 4,959,596 A | | 9/1990 | MacMinn et al. ............ 318/254 |
| 6,107,843 A | * | 8/2000 | de Gouy et al. ............. 327/105 |
| 6,157,694 A | * | 12/2000 | Larsson ......................... 377/48 |

OTHER PUBLICATIONS

Boutin, N. et al., "A Novel Frequency Multiplier," *IEEE Trans. on Instrumentation and Measurement*, IM–35(4):566–570, Dec. 1986.

* cited by examiner

*Primary Examiner*—Margaret R. Wambach
(74) *Attorney, Agent, or Firm*—Lisa K. Jorgenson; Harold H. Bennett, II; Seed IP Law Group PLLC

(57) ABSTRACT

A frequency multiplier circuit and a controlling method thereof, which measures a period of a waveform by counting cycles of a fixed frequency timing signal, and reproduces the period by adding a number of prefixed length subperiods of the fixed frequency to the cycle count, making it as equal as possible to the period, so to minimize the reproduction error.

16 Claims, 5 Drawing Sheets

US 6,556,644 B2

FREQUENCY MULTIPLIER CIRCUIT AND METHOD USING ABOVE CIRCUIT FOR A PERIOD TIME DIVISION IN SUBPERIODS, FOR A BRUSHLESS MOTOR

BACKGROUND OF THE INVENTION

The present invention relates to a frequency multiplier circuit and a method using above circuit for a period time division in subperiods of length as constant as possible, for a brushless motor.

DESCRIPTION OF THE RELATED ART

A brushless motor is a synchronous motor, the rotation of which is obtained by a current commutation in the windings in a way synchronous with the rotor position. It is necessary, therefore, to know exactly the rotor position to obtain the best accuracy in the motor working, and this position usually is deduced according two approaches: 1) by Hall effect position sensors; 2) by a counter-electromotive force signal (BEMF).

In this last driving choice the position information is completely stored in the BEMF's signal, i.e., in the case in which we have maximum BEMF we want to impose a maximum torque, in the case in which we have zero BEMF we want to impose a zero torque, and when we have a positive or negative BEMF we want to impose a positive or negative torque, respectively, and therefore, in order to drive multiphase brushless motors, we have to excite the motor's phases with voltage waveforms that are shifted 360/n degrees out of phase with each other, where n is the number of phase. For example, in a three phase brushless motor, therefore, we have voltage waveforms that are shifted 360/3=120 degrees out of phase with each other and said waveforms are subdivided in a number of samples giving a step waveform able to approximate the driving waveform.

In FIG. 1 a periodic time division in subperiods is shown.

As shown in such FIG. 1 we note a first axis of abscissa describing a time dependent periodic signal $T_c$ and a second axis of abscissa describing a time division of said period $T_c$ in subperiods $T_{sys}$. The $T_c$ signal points out a digital signal having period $T_c$, suitably deduced from BEMF. The difference between period $T_c$ and the subperiods $m*T_{sys}$ generates what is commonly known as period reproduction error and in the particular case we have an error $\epsilon$ defined by the formula:

$$\epsilon = T_c - m*T_{sys}*INT[INT(T_c/T_{sys})/m]$$

with $\epsilon$ in a value range $0 < \epsilon < m\ T_{sys}$, where INT(num) is a function that rounds a number down to the nearest integer.

In a steady state, the signal period $T_c$ of the signal is time independent and the error $\epsilon$ committed in the reproduction of period $T_c$ and the reproduced period $m*T_{sys}$, therefore formed by m subperiods, is a circuit evaluation parameter, that makes the measurement of the period $T_c$.

Therefore the accuracy of the approximation of the motor driving waveform, a waveform that changes as a function of the connected loads, i.e., the possible range of values among which the error E can change, is a qualitative and quantitative parameter of the circuit and of the control method thereof.

SUMMARY OF THE INVENTION

In view of the state of the art described, it is an object of the present invention to estimate the period of a particular waveform by a fixed frequency timing signal and to reproduce said period by approximating subperiods as equally as possible to each other.

According to the present invention, such object is achieved by a frequency multiplier circuit comprising an input terminal arranged to receive a period signal, a timing frequency greater than the inverse of said period, a first counter circuit, implemented to execute counting at a fixed first frequency, proportional to said timing frequency, said first counter circuit coupled to a register, a second counter circuit implemented to execute counting at a second timing frequency, an adder configured to increase by one the content of said register of ADJ subperiods every $2^i$ subperiods of said period, where ADJ is the value corresponding to the number i least significant bits of said register, so that the reproduction error of said period signal is as small as possible.

Furthermore, according to the present invention, such object is achieved by a frequency multiplier circuit comprising the following steps: a) accepting a timing frequency greater than of the inverse of said period length; b) executing counting by means of a first counter at a first fixed frequency proportional to said timing frequency; c) storing said counting in a register; d) executing counting by means of a second counter circuit at said timing frequency; e) increasing by one the stored value in said register during the ADJ subdivisions every $2^i$ subdivisions of said period; f) comparing an output value of said register and an output value of said second counter; g) generating a second frequency such as to minimize the reproduction error.

Thanks to the present invention, it is possible to make a frequency multiplier circuit, and employ a method using the above circuit for period time division, for a brushless motor, able to reproduce the motor driving voltage waveform with an increased accuracy, making possible to improve the phase relationship between the applied profile and the motor position.

BRIEF DESCRIPTION OF THE DRAWINGS

The features and the advantages of the present invention will be made evident by the following detailed description of an embodiment thereof which is illustrated as non-limiting example in the annexed drawings, wherein.

DETAILED DESCRIPTION OF THE INVENTION

In the embodiments shown in FIGS. 2, 3, 4 and 5 hereinafter described we refer to circuits particularly for three-phase brushless DC motors for exemplary reasons, but the invention is for general purpose circuits adapted for the division of a time variable period into a plurality of subperiods with as little a reproduction error of the same period as possible.

Figure 2:
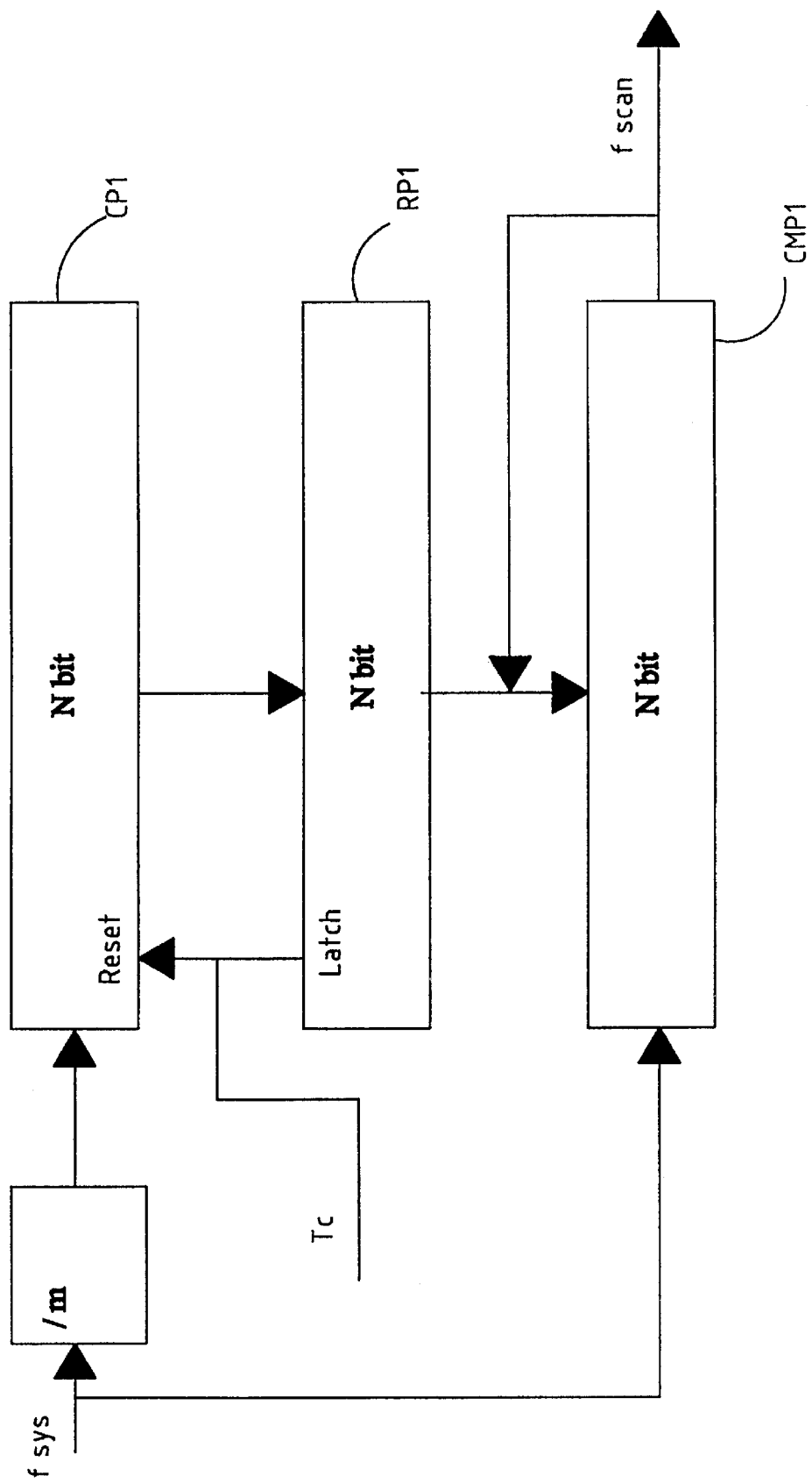
FIG. 2 shows a frequency multiplier circuit for a brushless motor.

In FIG. 2 a possible embodiment is shown in which we want to sample the waveform to be applied to the phases of a three-phase brushless motor (n=3) and to subdivide it into a number m of samples, with m being a multiple of the phase numbers, obtaining a step waveform able to approximate the driving waveform.

Figure 1:
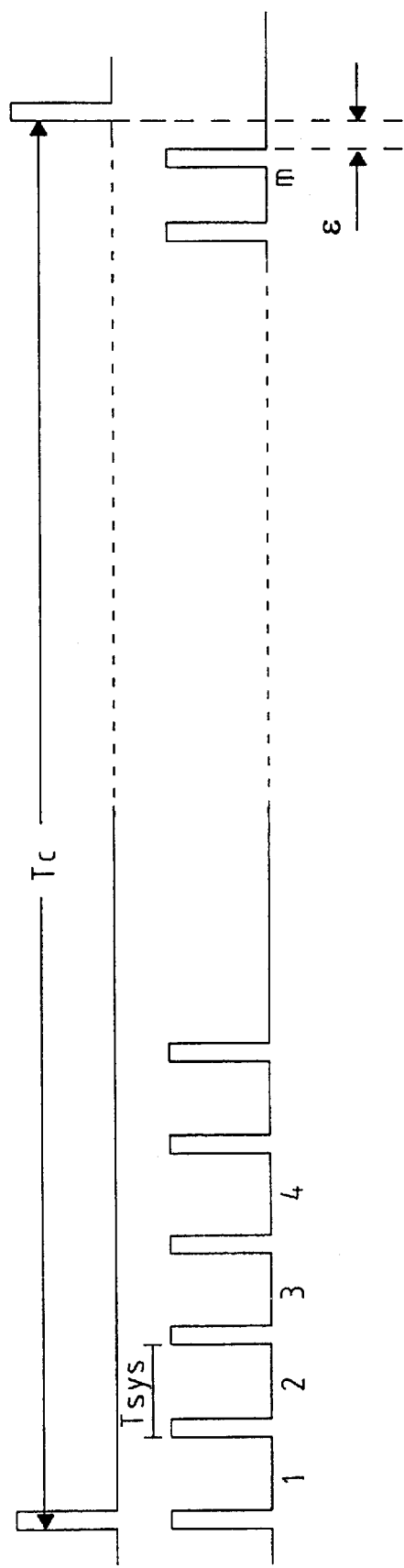
FIG. 1 shows a period division in submultiple subperiods.

This kind of embodiment consists in the use of a timing signal at a fixed frequency $f_{sys}=1/T_{sys}$ that is much higher than the motor electrical frequency $f_c=1/T_c$, changing as a function of the working conditions, and to count the period length of the period $T_c$ by using a N bit counter called CP1, timed by a signal obtained by dividing the fixed frequency signal $f_{sys}$ by the number m of parts in which the motor electrical period $T_c$ is to be subdivided, as shown in FIG. 1. A pin Reset resets the counter CP1, every period $T_c$.

Once the appropriate counting is obtained, referring to the previous period, the result is stored in a period register RP1 that is refreshed with the value $T_c$, by a pin Latch. The content of said period register RP1 is examined by a comparator CMP1 with a counter timed at frequency $f_{sys}$. The signals, formed by said CMP1, make a scanning frequency $f_{scan}$ that is a frequency m-times higher than the indicated signal of the period $T_c$.

The actual counting (p) in the counter CP1, at the end of every period $T_c$, is defined by the formula p=INT[INT($T_c$/$T_{sys}$)/m], and the resulting period is subdivided by a counter that counts p-times the period $T_{sys}$ resulting in every subperiod being, therefore, $p*T_{sys}$.

Particularly, if m=36 with n=3, the motor driving consists to apply at the 3 phases three samples shifted by 12 samples out of phase with each other, i.e., it is necessary to subdivide the motor electrical period into 36 subperiods as equal as possible to each other.

In such a case the committed error in the period reproduction changes as a function of the period length $T_c$ and of the frequency used to measure $f_{sys}$ and is defined by the previously expressed formula:

$$\epsilon=T_c-m*T_{sys}*INT[INT(T_c/T_{sys})/m]$$

with $\epsilon$ in a value range $0<\epsilon<m\ T_{sys}$.

Figure 3:
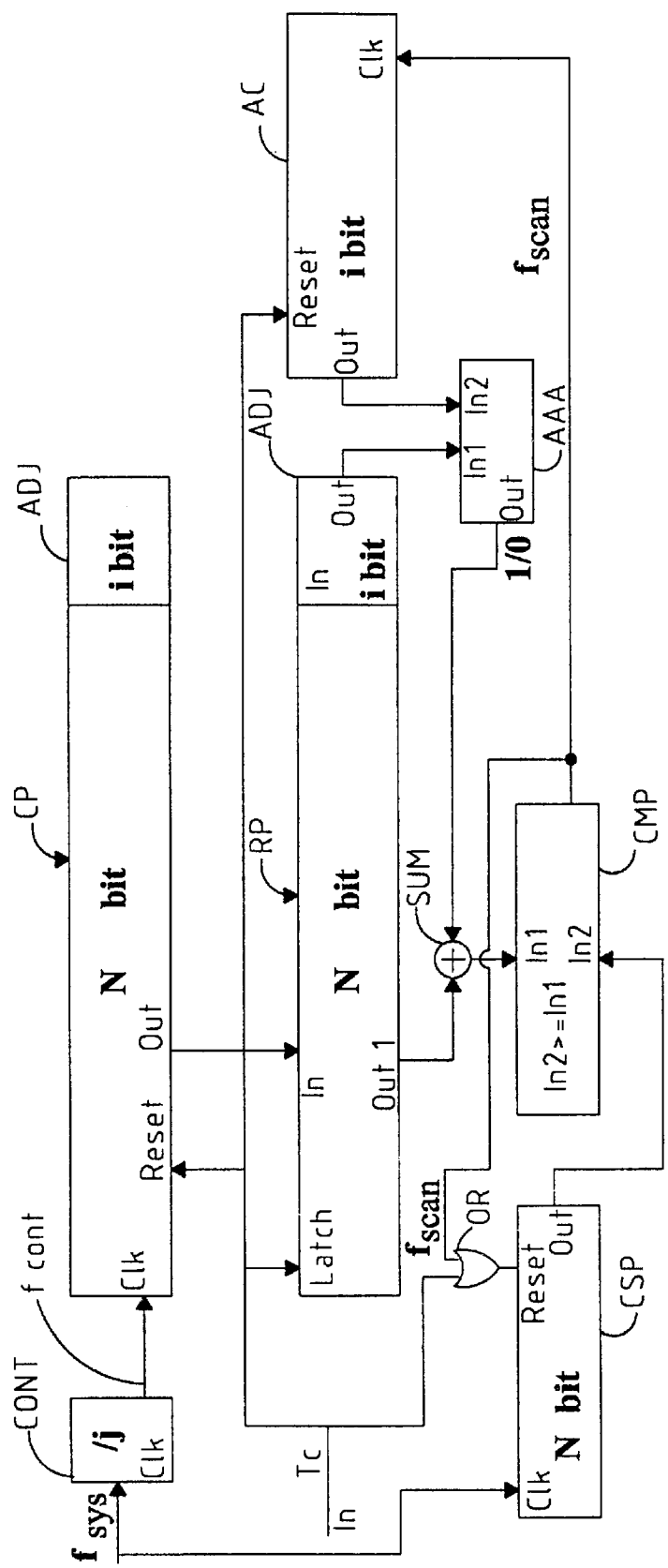
FIG. 3 shows a frequency multiplier circuit for a brushless motor according to the present invention.

In FIG. 3 a more accurate frequency multiplier circuit for a brushless motor is shown.

If we interpret the number m of parts in which we want to subdivide the period $T_c$ in the following way:

$$m=j*2^i$$

where "i" is the maximum exponent that we can give the factor 2 without exceeding the number m, while j is an odd number, also called odd factor.

As shown in FIG. 3, we note that at an input terminal In the circuit receives a periodic signal $T_c$ that is measured by a positive-step period counter CP, formed by "N+i" bit, with a counting frequency of $f_{cont}$ that is j times less than a fixed timing frequency $f_{sys}$. Counting is carried out through the pin Clk, which receives the frequency $f_{cont}$ produced by a block CONT according to prior art.

The content of the counter CP according to the present invention can be explained as the number of time periods $m/T_{sys}$ that passed from the start of the current period.

In fact if we consider for example m=48=3*$2^4$, that is j=3 and i=4, and considering also $T_{sys}$=80 nsec and $T_c$=1 msec we deduce that by making the binary division a function of the circuit signal clock, that is a function of $T_{sys}$, we find that INT[INT($T_c$/$T_{sys}$)/m]=100000100, and the binary division INT[INT($T_c$/$T_{sys}$)/j]=1000001000110, and by analyzing this last result, apart from the 4 least significant bits, we have the same binary code.

In fact the least significant "i" bits, also called ADJ, represent an index of the error that we make in the motor driving voltage waveform reproduction.

The "i" bits stored in the vector ADJ are expressible mathematically by a formula:

$$ADJ=INT\ \{r*j^{-1}\}$$

with r=RESTO {INT[INT($T_c$/$T_{sys}$)/m]}, where RESTO (num) is a function that returns the division remainder between two numbers, that is the remainder of the division INT[INT($T_c$/$T_{sys}$)/m].

Considering the exemplarily previously given values we find that the vector ADJ has a decimal form value equal to 6 and transformed into a binary digit formed by 4 bits, we have ADJ=0110; this number corresponds to the least significant 4 bits of the binary division INT[INT($T_c$/$T_{sys}$)j], previously written.

Therefore what the circuit makes is a division by a number j of a fixed and known frequency $f_{sys}$, that is $f_{sys}$/j. The resulting frequency is counted by a counter formed by "N+i" bits. In the most significant N bits of the counter CP there is an outcome equal to the outcome of the frequency counting $f_{sys}$/m according to the prior art. The least significant "i" bits of said counter CP represent an error index that of the driving voltage waveform reproduction.

The value stored in CP is evaluated repeatedly with the signal $T_c$ by means of a pin Reset, so to form the period $T_c$ that will be output, by means of a pin Out, and stored in a period register RP, having the same dimension as the counter CP, when the new signal $T_c$ arrives, by means of a pin Latch. The register RP is a D type flipflop storing device.

A subperiod positive-step counter CSP has a counting frequency equal to the fixed frequency $f_{sys}$, by the pin Clk, and it is suitable to the subperiod counting, making the time digitization of the motor driving voltage approximation. It is reset, by the pin Reset, as a function of the outgoing value of the logic gate OR, as result of the combination between the signal $T_c$ and a calculated frequency of a comparator circuit CMP, called $f_{scan}$, where $f_{scan}$ is a frequency m-times bigger than the signal $T_c$.

The output of the counter CSP is connected to the input In2 of the comparator block CMP, which creates as an output signal said frequency $f_{scan}$ if the value stored in said counter CSP is higher than or equal to the value on the pin In1.

In order to determine the input value of the comparator CMP a further positive step counter called AC, formed by "i" bits, having a counting frequency equal to $f_{scan}$, by the pin Clk, is necessary. The counter AC is reset, by the pin Reset, by the signal $T_c$ and it outputs, by the pin Out, the subperiod number present in a period $T_c$.

Moreover said counter AC starts again to count from 0 after having reached the maximum possible value.

Moreover a logic gate block AAA has at input In1, the "i" bits of the register RP, and it has an output pin Out2 for only the "i" bits representing the vector ADJ, that is, the bits representing the error dimension, and it has at input In2 the value stored in the register AC, that is the number associated to the generic subperiod forming the period $T_c$. The block AAA gives, as an output, by the pin Out, a true/false value (1/0) depending on a function able to realize any signal clock distribution, i.e., able to add or not a signal clock at every subperiod.

For example the block AAA can realize a distribution function so that if the stored value of the block AC is less than the value of the vector ADJ, the block AAA gives a signal clock to the first ADJ every $2^i$ subperiods, with ADJ=INT $\{r*j^{-1}\}$.

In this way the first ADJ every $2^i$ subperiods forming the period to be measured are more spaced so to reduce the error $\epsilon$.

The outgoing value from said block AAA is added, by an adder SUM, to the value stored in the most significant bits of the register RP and the value of said sum is the input signal for the comparator CMP. The comparator CMP compares the instantaneous values of the counter CSP with the values given by the sum of what is stored in the most significant bit of the register RP plus the values of the block AAA, therefore the comparator CMP generates the signal $f_{scan}$ that represents therefore a new reference for the motor rotor position.

In this way, by adding every $2^i$ subperiods a number ADJ of signal clocks, each one having a length of $T_{sys}$, we obtain a sampling error given by the formula:

$$\epsilon = T_c - m \ast T_{sys} \ast INT[INT(T_c/T_{sys})/m] - j \ast ADJ \ast T_{sys}$$

with $\epsilon$ in a value range $0 < \epsilon < j \ast T_{sys}$, with $j \ast T_{sys} < m \ast T_{sys}$.

With the aforementioned values, the error the present invention is in a value range between $0 < \epsilon < 240$ nsec, while with the embodiment of FIG. 2 the error is in a value range between $0 < \epsilon < 3480$ nsec, that is a range value considerably more reduced.

We obtain better results, that is a smaller error $\epsilon$, if the factor $2^i$ has a higher exponent i.

According to the present invention, therefore, the circuit makes, for example, a distribution of additional signal clocks to the first ADJ subperiods every $2^i$ making $\epsilon$ smaller, thereby improving considerably the reproduction precision.

In a particular embodiment the Applicant has found that we can get a higher distribution uniformity of the additional signal clocks by using the information stored in the vector ADJ, formed by "i" bits, and by the counter value AC, also formed by "i" bits, so to realize a distribution function fit to add signal clocks to the subperiods according a scheme hereinafter described in the flow chart of FIG. 4 and in a schematic simplified circuit representation of FIG. 5.

Figure 4:
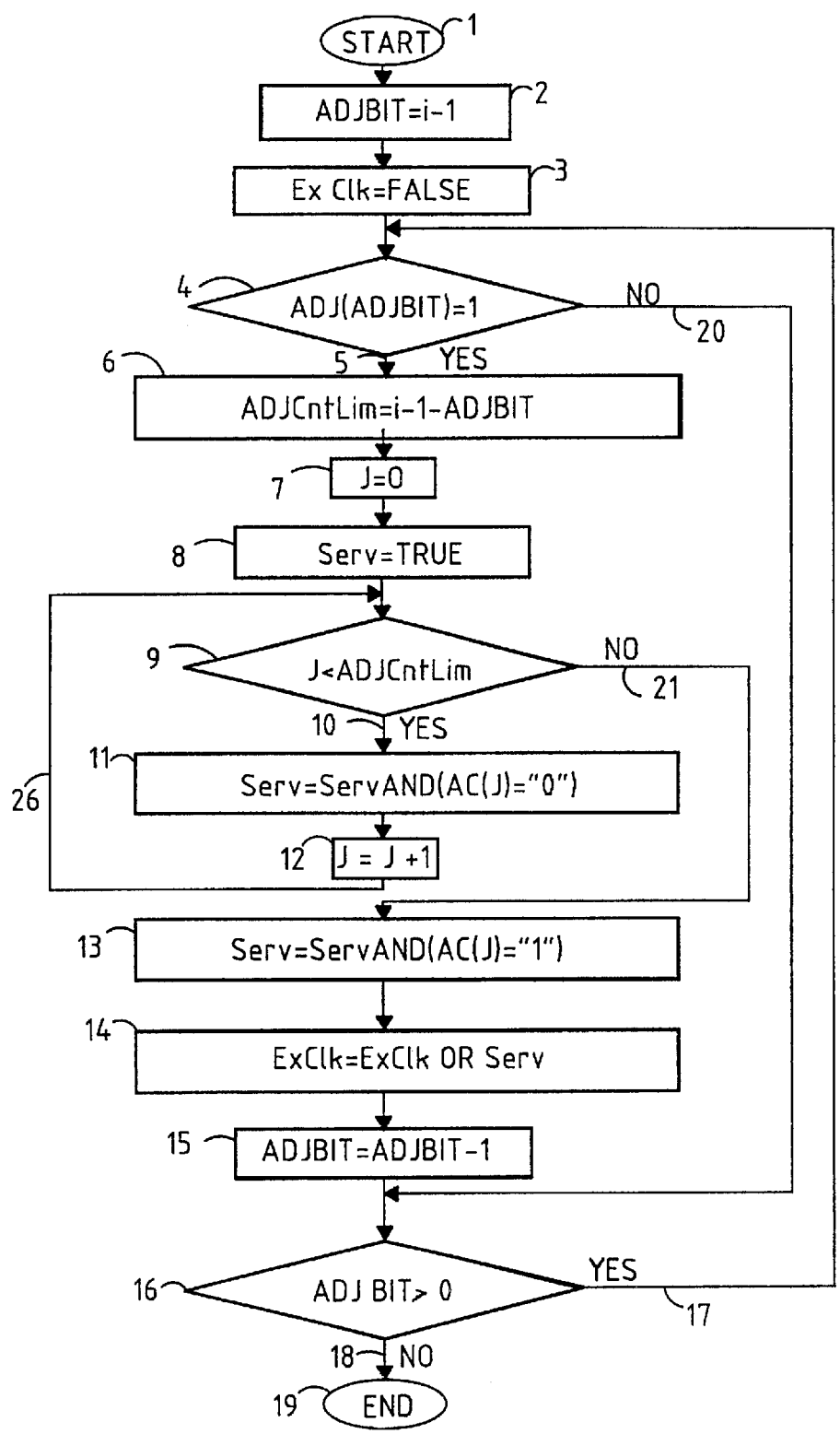
FIG. 4 shows a flow chart of an embodiment of a block of the circuit illustrated in FIG. 3.

In FIG. 4 a flow chart is shown, describing the block implementation AAA of the circuit of FIG. 3.

As shown in FIG. 4 we note a starting block 1 called START and two allocation blocks 2 and 3. The block 2 gives the variable ADJBIT a value equal to "i−1" with "i" being the bit number deduced from the formula m=j*$2^i$, while the block 3 gives a variable ExClk the Boolean value FALSE. The variable ExClk, at the end of the analyzing process, is the output signal, by the pin Out, from the logic gate block AAA shown in FIG. 3 or also as the circuit output shown in FIG. 5.

Afterwards a test 4 is performed to verify if the vector value ADJ in position ADJBIT is equal to 1, that is if the bit in given position ADJBIT is one or is a zero. In the affirmative case, path 5, the assignment "i−1-ADJBIT", block 6, to a variable ADJCntLim is performed.

Moreover two assignment blocks 7, wherein an index j is set to zero, and 8, wherein a temp variable Serv is set to a Boolean value TRUE, are performed in succession.

Moreover a further test 9 is performed to verify if the index value j is less than the variable value ADJCntLim. In the affirmative case, path 10, an AND operation between the variable Serv and the counter value AC in position j is performed, that is the variable Serv is equal to 1 if the bit in position "j" of the counter AC is 0.

A unit increment operation of the index j, block 12, is then performed and moreover, path 26, a further test cycle 9 is performed. In the case the test 9 is negative, path 21, that is, in the case in which index j is greater than the variable value ADJCntLim, a block 13 is performed wherein an operation AND is performed between a Boolean value (true/false) and the result of condition AC(j)=0, that is, that the variable Serv is equal to 1 if the bit in the position "j" of the counter is 1.

Afterwards an assignment block 14 is performed, wherein an operation OR is performed between the variables ExClk and Serv, in which we decide if we give an additional signal clock or not, outputting from the block AAA of FIG. 3 a high value, 1.

Moreover an assignment block 15 is performed, wherein we decrease by a unit the variable value ADJBIT and subsequently a test 16 is performed on said variable ADJBIT. If the result is positive, path 17, the test 4 is processed again, while if the result is negative, path 18, the flow chart ends in block 19.

The block 15 is performed immediately after the test 4 in the case in which the test result is negative, path 20, that is, the case in which the vector ADJ in position ADJBIT is different from 1.

It is possible to obtain a complementary signal clock distribution having analogous properties by changing in the assignment blocks 11 and 13 the condition to which AC(j) must to be submitted, that is AC(j)=1 in the block 11 and AC(j)=0 in the block 13.

Figure 5:
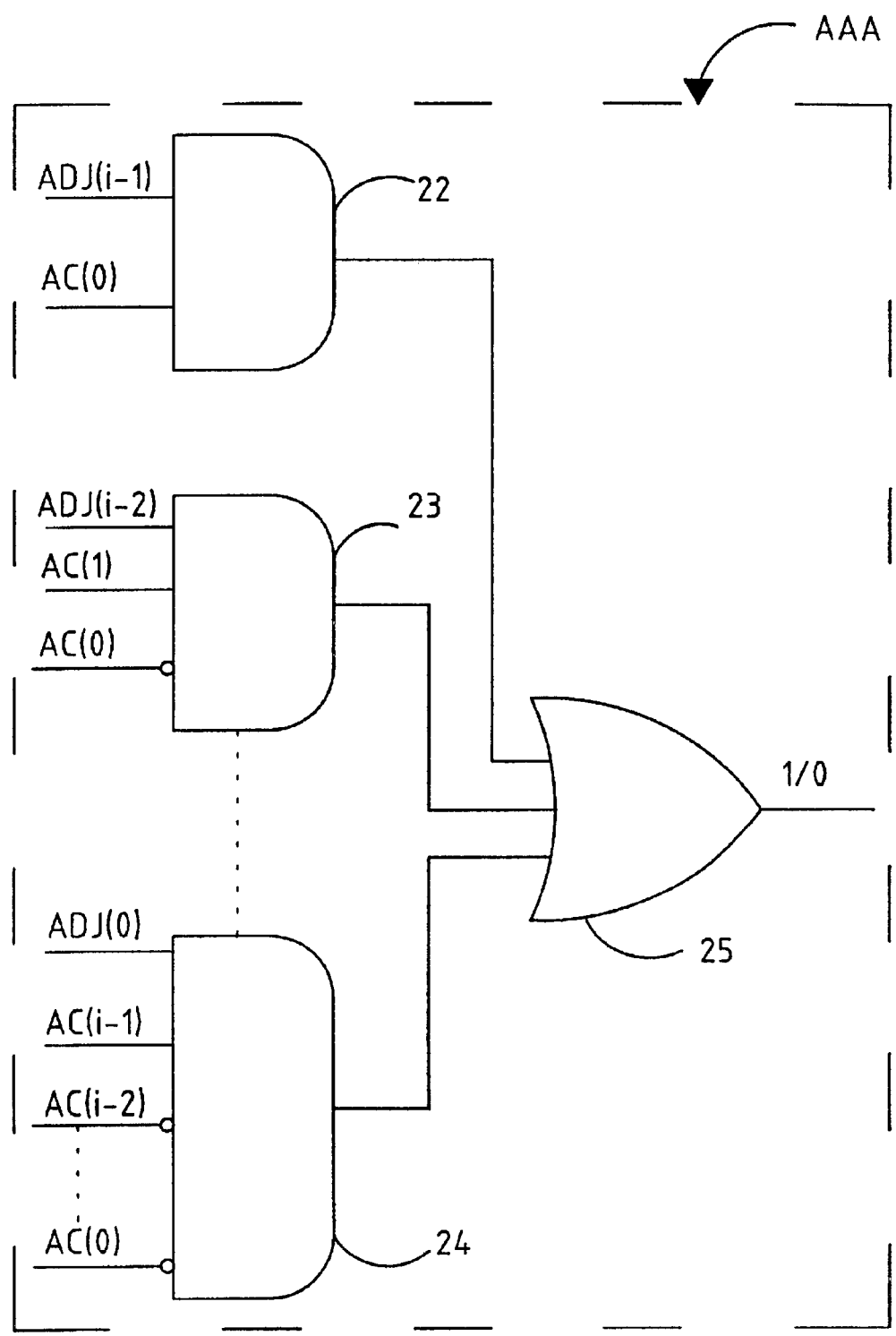
FIG. 5 shows a sketched embodiment of the flow chart illustrated in FIG. 4.

The block AAA has, therefore, as input the counter AC and the vector bit ADJ and it gives as output a value true/false (1/0), which is the variable ExClk, according to a circuit, described in a schematic way in FIG. 5, according to the most significant bit of the "i" bits.

In the flow chart of FIG. 4 with respect to the most significant bit of the "i" bits of the vector ADJ, the vector symbolizing the reference, is therefore constant during the whole period $T_c$, and corresponds to the counter value AC, which changes at every subperiod. The most significant bit of ADJ indicates the necessity to add a signal clock to half of the subperiods, choosing indifferently the even subperiods of AC (least significant bit equal to 0) or the odd subperiods of AC (least significant bit equal to 1). The second most significant bit of the "i" bits indicates the necessity to add a signal clock to a quarter of subperiods of AC, choosing indifferently among previously not observed even (least significant bit 0 and second least significant bit 1) or odd subperiods (least significant bit 1 and second least significant bit 0). We can iterate this method for all the bits of the counter AC.

For example, in the first cycle of the flow chart, AC being an "i" bits counter that counts the subperiods from zero from the period start and that starts again from zero every time the saturation is reached, if the most significant bit of ADJ is equal to 1, it means that at least a half of the subperiods must be the additional signal clock and therefore we can add at every odd subperiod a signal clock, so that it can be distinguished by the fact that the least significant bit of the counter AC is equal to 1.

At the second cycle of the flow chart if the second least significant bit of ADJ is equal to 1 it means that at least a quarter of the subperiods must have the additional signal clock and therefore we can add the signal clock to the even subperiods (that aren't called in the previous cycle) that aren't multiple of $2^2$; these subperiods are distinguished by the following features: in the counter AC the least significant bit is equal to "0", while the second least significant bit is equal to "1".

At the third cycle of the flow chart if the third least significant bit of ADJ is equal "1" it means that at least one eighth of the subperiods must be the additional signal clock and therefore we can add the signal clock to the even subperiods that are multiple of $2^2$ (that aren't called in the previous cycle) but aren't multiple of $2^3$; these subperiods are distinguished by the following features: in the counter AC the least significant bit is "0", the second least significant bit is "0", while the third least significant bit is "1".

This process can be iterated for all the "i" bits of the counter AC and in the vector ADJ, to the end of the bits.

In FIG. 5 a schematic embodiment of the flow chart of FIG. 4 is shown.

As shown in FIG. 5 we note a plurality "i" of AND logic gates 22, 23 and 24, wherein "i" is an index deduced by the formula $m=j*2^i$, and their output signals are input into an OR logic gate 25. The logic gate 22, for example, outputs a value that is high only if the inputs are high, that is, in the case in which the vector value ADJ, in position "i−1", which is the most significant bit, and the counter value AC, in position zero, which is the least significant bit, are equal to 1. That is the most significant bit of the vector ADJ is equal to 1 and the least significant bit of the counter AC is equal to 1 and therefore, for example, at least the half of the subperiods must be a signal clock and we can add this signal clock at every odd subperiod by outputting high value from the logic gate 25. Analogous arguments apply for the logic gates 23 and 24.

What is claimed is:

1. A frequency multiplier circuit comprising:
   a first input terminal arranged to receive a periodic signal having a period;
   a first counter circuit, implemented to execute counting at a fixed first frequency proportional to a timing frequency that is greater than the inverse of said period, said first counter circuit determining a first count value that includes a count vector of N most significant bits and a vector ADJ of i least significant bits;
   a register coupled to said first counter circuit to receive said first count value;
   a second counter circuit implemented to execute counting at said timing frequency; and
   an adder configured to increase by vector ADJ every $2^i$ subperiods of said period.

2. The frequency multiplier circuit according to the claim 1, further comprising a dividing block that converts the timing frequency to the first frequency, where the first frequency is j-times slower than the timing frequency, where j, an odd number, is deduced from the formula $m=j*2^i$, m being a number of subperiods into which the period is to be subdivided.

3. The frequency multiplier circuit according to the claim 2 wherein said first counter circuit is arranged to store a binary representation of said first count value so that the count vector is a numerical representation of the division $INT[INT(T_c/T_{sys})/m]$, where $T_c$ is the periodic signal, $T_{sys}$ is the inverse of the timing frequency, and the vector ADJ is a value showing the integer part of $\{r*j^{-1}\}$ with $r=RESTO\{INT[INT(T_c/T_{sys})/m]\}$, where RESTO(number) is a function that returns the remainder of the division $INT[INT(T_c/T_{sys})/m]$.

4. The frequency multiplier circuit according to the claim 1, wherein said register comprises as the count vector, the numerical representation of the division $INT[INT(T_c/T_{sys})/m]$, and as the vector ADJ, a value showing the integer part of $\{r*j^{-1}\}$ with $r=RESTO\{INT[INT(T_c/T_{sys})/m]\}$, where m is a number of subperiods into which the period is to be subdivided, $T_c$ is the periodic signal, $T_{sys}$ is the inverse of the timing frequency, and RESTO(number) is a function that returns the remainder of the division $INT[INT(T_c/T_{sys})/m]$, and j is an odd number such that $m=j*2^i$.

5. The frequency multiplier circuit according to the claim 1, further comprising:
   a third counter circuit arranged to execute a counting at a fixed second frequency; and
   a logic gate block coupled to said third counter circuit and to said register, wherein said logic gate block is arranged to output signal clocks corresponding to the vector ADJ every $2^i$ subperiods.

6. The frequency multiplier circuit according to the claim 5, further comprising a comparator arranged to receive an output signal of said second counter circuit and an output signal from said adder, the output signal from said adder being the sum of the count vector of said register and of the output of said logic gate block, said comparator being arranged to output said second frequency based on a comparison of the output signals of the second counter circuit and the adder, until the value of the output signal of said second counter circuit is greater than or equal to the value of the output signal of said adder.

7. The frequency multiplier circuit according to claim 5, further comprising:
   a dividing circuit that converts the timing frequency to the first frequency; and
   a second input terminal that inputs said timing frequency to provide a signal at an input terminal of said dividing circuit and at an input terminal of said second counter circuit, wherein the first input terminal provides the periodic signal at a reset terminal of said first counter circuit, at a storing terminal of said register, and at a reset terminal of said third counter circuit.

8. The frequency multiplier circuit according to the claim 5, wherein said logic gate block comprises a plurality of AND logic gates and an OR logic gate, said plurality of AND logic gates have an input vector ADJ of said register and output bits of said third counter circuit, wherein said register includes a storing terminal that receives said periodic signal and said third counter circuit includes a reset terminal that receives said periodic signal, said OR logic gate having, as input, an output from each of said plurality of AND logic gates, so as to distribute a fixed number of signal clocks as a function of the vector ADJ.

9. The frequency multiplier circuit according to the claim 5, wherein said third counter circuit includes i bits, where i is equal to the maximum index assignable to the factor 2 of the formula $m=j*2^i$ where m is a number of subperiods into which the period is to be divided and j is the smallest odd number that satisfies the formula.

10. The frequency multiplier circuit according to the claim 1, wherein said second counter circuit employs N bits.

11. A method to generate a period time division signal in subperiods, comprising:
   receiving a periodic signal having a period;
   accepting a timing frequency greater than the inverse of said period;
   executing a counting by a first counter at a first fixed frequency proportional to said timing frequency, the counting including a count vector of N most significant bits and a reproduction error vector ADJ of i least significant bits;
   storing a value of said counting in a register;
   executing a counting by a second counter circuit at said timing frequency;
   adding, to the counting in said register, ADJ subdivisions every $2^i$ subdivisions of said period;
   comparing an output value of said register and an output value of said second counter; and
   generating a second frequency such as to minimize the reproduction error.

12. Method according the claim 11, wherein said first frequency is j-times slower than said timing frequency, where j, an odd number, is deduced from the formula $m=j*2^i$, m being a number of subperiods into which the period is to be subdivided.

13. Method according the claim 11, wherein during the adding step the adding of ADJ subdivisions to the counting in said register is a function of the value of the least significant bits of said register and a function of a stored value in a third counter.

14. Method according to claim 11, wherein said second frequency is generated when the output value of said second counter is greater than or equal to the output value of said register.

15. A device comprising:

an input terminal configured to receive a repeating periodic signal having a period;

a first counter counting at a first frequency A wherein the first frequency is approximately equal to a desired multiple M of the reciprocal of the period, and having a reset terminal coupled to the input terminal such that the periodic signal resets the first counter;

a second counter counting at a second frequency B wherein the second frequency is a multiple of the first frequency, and wherein the relationship of the second frequency B to the first frequency A may be expressed as $B=A*2^i$, where $2^i$ is the multiple, the second counter having a reset terminal coupled to the input terminal such that the periodic signal resets the second counter;

a register having an input coupled to an output of the second counter and configured to store i least significant bits of the second counter as an integer ADJ, the register having a reset terminal coupled to the input terminal such that the register stores a new value ADJ at each periodic signal; and a circuit configured to adjust the first frequency by a value equal to ADJ cycles of the second frequency every M cycles of the first frequency.

16. A method comprising:

receiving a repeating periodic signal at a guide frequency;

counting at a first frequency approximately equal to a desired multiple M of the guide frequency, the counting restarting at each periodic signal;

counting at a second frequency equal to a multiple $2^i$ of the first frequency, the counting restarting at each periodic signal;

storing a number i of least significant bits of the counting at the second frequency as an integer ADJ;

adjusting the first frequency by a value equal to ADJ cycles of the second frequency every M cycles of the first frequency.

* * * * *